United States Patent
Kageyama et al.

(10) Patent No.: US 11,988,521 B2
(45) Date of Patent: May 21, 2024

(54) NAVIGATION SYSTEM, NAVIGATION DISPLAY METHOD, AND NAVIGATION DISPLAY PROGRAM

(71) Applicant: FAURECIA CLARION ELECTRONICS CO., LTD., Saitama (JP)

(72) Inventors: Katsuhiko Kageyama, Tokyo (JP); Arata Hayashi, Saitama (JP); Naoya Baba, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 498 days.

(21) Appl. No.: 17/277,889

(22) PCT Filed: Mar. 18, 2019

(86) PCT No.: PCT/JP2019/011080
§ 371 (c)(1),
(2) Date: Mar. 19, 2021

(87) PCT Pub. No.: WO2020/059188
PCT Pub. Date: Mar. 26, 2020

(65) Prior Publication Data
US 2021/0348937 A1 Nov. 11, 2021

(30) Foreign Application Priority Data

Sep. 21, 2018 (JP) .................................. 2018-177539

(51) Int. Cl.
*G01C 21/36* (2006.01)
*B60R 1/00* (2022.01)
(Continued)

(52) U.S. Cl.
CPC .............. *G01C 21/367* (2013.01); *B60R 1/24* (2022.01); *B60W 30/12* (2013.01);
(Continued)

(58) Field of Classification Search
None
See application file for complete search history.

(56) References Cited

U.S. PATENT DOCUMENTS

| | | | |
|---|---|---|---|
| 2003/0071809 A1* | 4/2003 | Matsumoto | G06T 15/20 345/419 |
| 2007/0198184 A1* | 8/2007 | Yoshioka | G09B 29/106 701/426 |

(Continued)

FOREIGN PATENT DOCUMENTS

| EP | 3106838 A2 | 12/2016 |
|---|---|---|
| JP | H06231391 A * | 8/1994 |

(Continued)

OTHER PUBLICATIONS

Machine translation of JP 2009139240 A (Year: 2009).*

(Continued)

*Primary Examiner* — Anne Marie Antonucci
*Assistant Examiner* — Kyle S Park
(74) *Attorney, Agent, or Firm* — Volpe Koenig

(57) ABSTRACT

The present invention is to perform appropriate display on a display of a navigation system. A navigation system that displays an image on a display and presents the image to an occupant of a vehicle, acquires data for generating drawing elements from at least one information source and stores the data in a temporary storage for each of the drawing elements included in the image, selects, from among normal available data stored in the temporary storage, data based on the information source determined in accordance with a predetermined setting, and causes a drawing processor to draw an image combining the drawing elements based on the selected data.

12 Claims, 16 Drawing Sheets

(51) Int. Cl.
*B60R 1/24* (2022.01)
*B60W 30/12* (2020.01)
*G01C 21/34* (2006.01)
*G05D 1/00* (2006.01)

(52) U.S. Cl.
CPC ..... *G01C 21/3415* (2013.01); *G01C 21/3658* (2013.01); *G05D 1/0088* (2013.01); *B60R 2300/301* (2013.01); *B60R 2300/8086* (2013.01); *B60W 2420/403* (2013.01)

(56) References Cited

U.S. PATENT DOCUMENTS

| | | | |
|---|---|---|---|
| 2010/0256900 A1 | 10/2010 | Yamaguchi et al. | |
| 2017/0059861 A1* | 3/2017 | Furuya | G02B 27/0101 |
| 2020/0269759 A1* | 8/2020 | Watanabe | B60R 1/00 |
| 2020/0298876 A1* | 9/2020 | Mimura | B60R 16/02 |

FOREIGN PATENT DOCUMENTS

| | | |
|---|---|---|
| JP | 2000-211452 A | 8/2000 |
| JP | 2009-139240 A | 6/2009 |
| JP | 2017-097709 A | 6/2017 |

OTHER PUBLICATIONS

Machine translation of JP H06231391 A (Year: 1994).*
Extended European Search Report dated Dec. 8, 2022 for European Patent Application No. 19862725.9.
Invitation pursuant to Rule 62a(1) EPC and Rule 63(1) EPC dated May 16, 2022 for European Patent Application No. 19862725.9.
Japanese Office Action dated Aug. 2, 2022 for Japanese Patent Application No. 2018-177539.

* cited by examiner

FIG.11

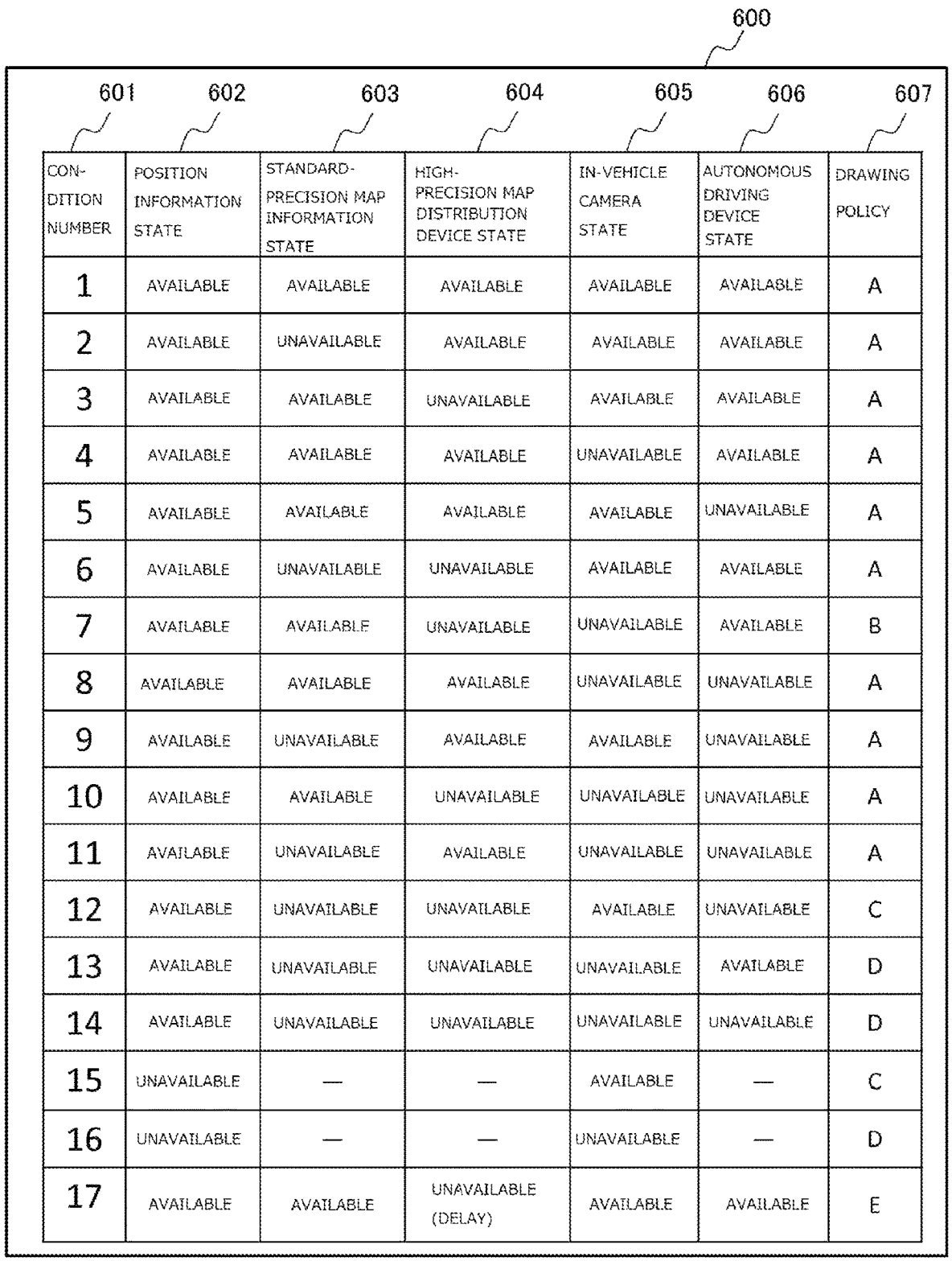

| Condition Number | Position Information State | Standard-Precision Map Information State | High-Precision Map Distribution Device State | In-Vehicle Camera State | Autonomous Driving Device State | Drawing Policy |
|---|---|---|---|---|---|---|
| 1 | AVAILABLE | AVAILABLE | AVAILABLE | AVAILABLE | AVAILABLE | A |
| 2 | AVAILABLE | UNAVAILABLE | AVAILABLE | AVAILABLE | AVAILABLE | A |
| 3 | AVAILABLE | AVAILABLE | UNAVAILABLE | AVAILABLE | AVAILABLE | A |
| 4 | AVAILABLE | AVAILABLE | AVAILABLE | UNAVAILABLE | AVAILABLE | A |
| 5 | AVAILABLE | AVAILABLE | AVAILABLE | AVAILABLE | UNAVAILABLE | A |
| 6 | AVAILABLE | UNAVAILABLE | UNAVAILABLE | AVAILABLE | AVAILABLE | A |
| 7 | AVAILABLE | AVAILABLE | UNAVAILABLE | UNAVAILABLE | AVAILABLE | B |
| 8 | AVAILABLE | AVAILABLE | AVAILABLE | UNAVAILABLE | UNAVAILABLE | A |
| 9 | AVAILABLE | UNAVAILABLE | AVAILABLE | AVAILABLE | UNAVAILABLE | A |
| 10 | AVAILABLE | AVAILABLE | UNAVAILABLE | UNAVAILABLE | UNAVAILABLE | A |
| 11 | AVAILABLE | UNAVAILABLE | AVAILABLE | UNAVAILABLE | UNAVAILABLE | A |
| 12 | AVAILABLE | UNAVAILABLE | UNAVAILABLE | AVAILABLE | UNAVAILABLE | C |
| 13 | AVAILABLE | UNAVAILABLE | UNAVAILABLE | UNAVAILABLE | AVAILABLE | D |
| 14 | AVAILABLE | UNAVAILABLE | UNAVAILABLE | UNAVAILABLE | UNAVAILABLE | D |
| 15 | UNAVAILABLE | — | — | AVAILABLE | — | C |
| 16 | UNAVAILABLE | — | — | UNAVAILABLE | — | D |
| 17 | AVAILABLE | AVAILABLE | UNAVAILABLE (DELAY) | AVAILABLE | AVAILABLE | E |

NAVIGATION SYSTEM, NAVIGATION DISPLAY METHOD, AND NAVIGATION DISPLAY PROGRAM

TECHNICAL FIELD

The present invention relates to a navigation system that displays images and characters on a display screen using map information.

BACKGROUND ART

Patent Literature 1 discloses a technique for generating information to be displayed on a display by combining map information and information of various in-vehicle sensors and the like, in a navigation system mounted on an automobile. Patent Literature 1 discloses "an image display device that displays, on a display surface of an in-vehicle display of a vehicle, an image relating to autonomous driving control of an autonomous driving system on the basis of information acquired from the autonomous driving system of the vehicle, the image display device comprising a stability information acquisition unit that acquires, from the autonomous driving system, stability information on stability of the autonomous driving control, a subsequent action information acquisition unit that acquires subsequent action information on a subsequent action of the vehicle by the autonomous driving control from the autonomous driving system, and a display controller that controls displaying of the in-vehicle display, in which when the vehicle is in the autonomous driving control, the display controller controls to display a traveling road overhead image that displays a bird's eye view of the vehicle and a traveling road on which the vehicle travels, a stability display image that is located in a traveling direction of the vehicle in the traveling road overhead image and changes, in response to the stability information, in an elongated frame extending in a direction intersecting the traveling direction, and a subsequent action text image that is located in the traveling direction relative to the stability display image and indicates the subsequent action information".

CITATION LIST

Patent Literature

Patent Literature 1: JP 2017-97709 A

SUMMARY OF INVENTION

Technical Problem

The technique disclosed in Patent Literature 1 generates an image of a bird's-eye view of a road (overhead image), and presents, on the bird's-eye view image, an image displaying stability and information indicating a subsequent action. However, in Patent Literature 1, consideration is not given to continuing appropriate display when a problem occurs in data for generating the overhead image, data for calculating the stability or the subsequent action, or an information source of those data.

An object of the present invention is to provide a technique that enables appropriate displaying on a display of a navigation system.

Solution to Problem

A navigation system according to one aspect of the present invention displays an image on a display and presents the image to an occupant of a vehicle, the navigation system including a drawing processor configured to draw an image on the display, a temporary storage configured to hold data for generating the image, and a controller configured to display the image on the display using the drawing processor and the temporary storage, in which the controller acquires data for generating drawing elements from at least one information source and stores the data in the temporary storage for each of the drawing elements included in the image, selects, from among normal available data stored in the temporary storage, data based on an information source determined in accordance with a predetermined setting, and causes the drawing processor to draw an image combining the drawing elements based on the selected data.

Advantageous Effects of Invention

The present invention enables appropriate displaying on the display of the navigation system.

BRIEF DESCRIPTION OF DRAWINGS

FIG. 11 is a diagram showing an example of an information source state management table according to a second embodiment.

DESCRIPTION OF EMBODIMENTS

Hereinafter, embodiments will be described with reference to the drawings.

First Embodiment

Figure 1:
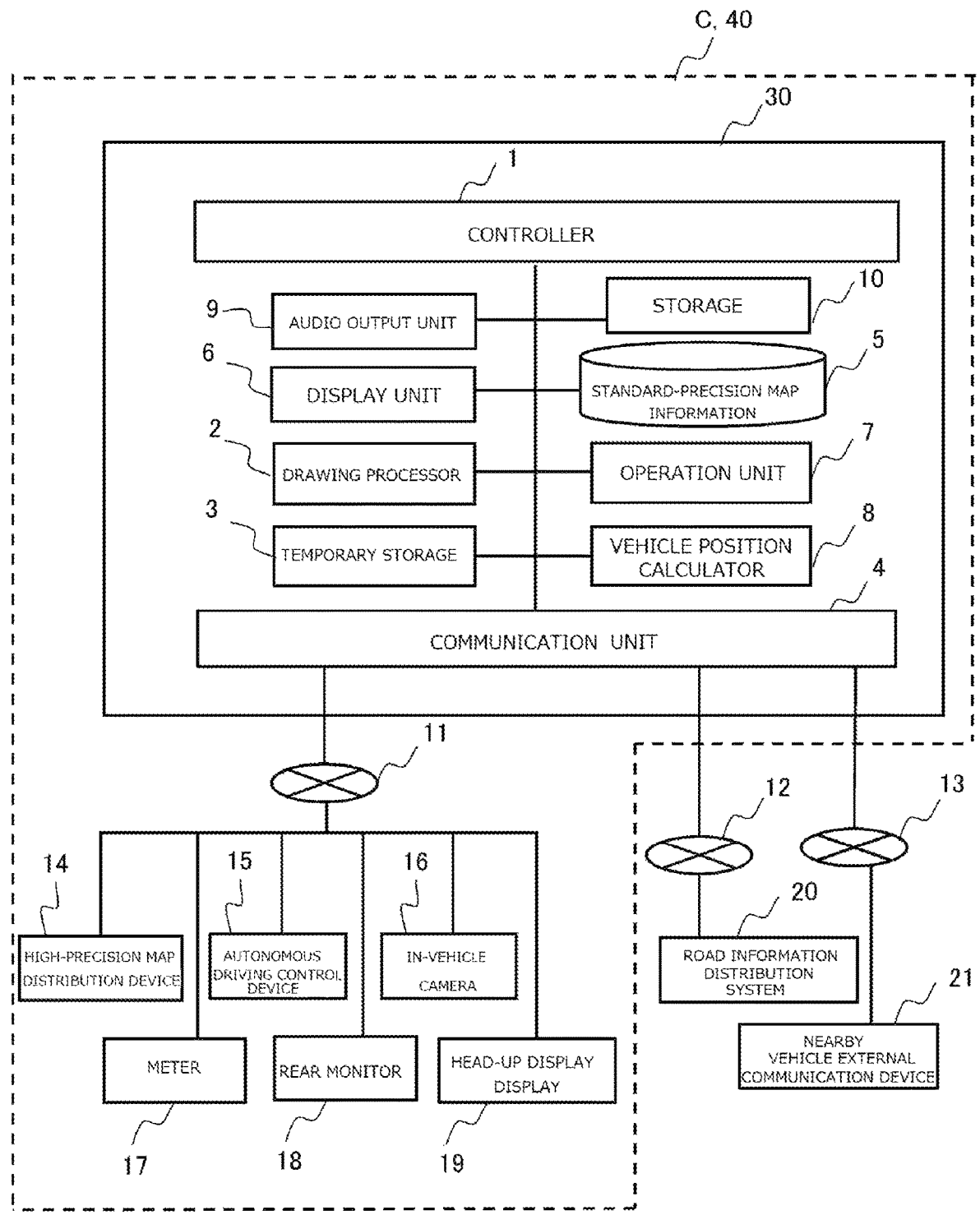
FIG. 1 is a diagram showing a configuration example of a navigation system according to a first embodiment.

FIG. 1 is a diagram showing a configuration example of a navigation system 30 according to a first embodiment.

A vehicle C includes an in-vehicle system 40 that achieves various functions for the vehicle C. The in-vehicle system 40 has the navigation system 30. The navigation system 30 is fixed to or detachably installed in the vehicle C, and presents route guidance and the like to an occupant of the vehicle C. Hereinafter, the vehicle C may be referred to as "own vehicle".

<Navigation System>

The navigation system 30 includes a controller 1, a drawing processor 2, a temporary storage 3, a communication unit 4, a standard-precision map information 5, a display unit 6, an operation unit 7, a vehicle position calculator 8, an audio output unit 9, and a storage 10.

The controller 1 executes a computer program and achieves functions of each part of the navigation system 30. The controller 1 is, for example, a processor such as a central processing unit (CPU).

The drawing processor 2 draws an image at high speed. The drawing processor 2 is, for example, a dedicated processor for drawing such as a graphical processing unit (GPU).

The temporary storage 3 provides a recording area where data can be read and written at high speed. The temporary storage 3 is, for example, a volatile memory such as random access memory (RAM).

The communication unit 4 connects to a network and controls communication with an external device.

The standard-precision map information 5 is map information having standard precision, and is used for searching for a route from a starting point to a destination, for generating a navigation image, and the like.

The display unit 6 displays the navigation image generated by the controller 1 and the drawing processor 2. The display unit 6 is, for example, a liquid crystal display. The navigation image provides the occupant of the vehicle C with various information.

The operation unit 7 provides an operation mechanism for the navigation system 30. The operation unit 7 includes, for example, a button or a touch panel. The operation unit 7 detects an operation (input) from the occupant of the vehicle C and notifies the controller 1 of the operation (input).

The vehicle position calculator 8 calculates a current position of the vehicle C and/or a traveling direction, traveling speed, acceleration, and the like of the vehicle C. The vehicle position calculator 8 calculates the current position and/or the traveling direction and the like of the vehicle C by using the global positioning satellite system (GPS), for example. Alternatively, the vehicle position calculator 8 acquires position information from an external device via the communication unit 4 and calculates the current position and/or the traveling direction and the like of the vehicle C.

The audio output unit 9 outputs various sounds such as a guidance sound, a warning sound, an alarm, and music to the occupant of the vehicle C. The audio output unit 9 is, for example, a speaker.

The storage 10 stores the computer program executed by the controller 1 and data. The storage 10 is, for example, a flash memory or a non-volatile memory such as a hard disk drive (HDD).

<In-Vehicle System>

The in-vehicle system 40 has the navigation system 30, an in-vehicle unit network 11, an external communication network 12, an inter-vehicle communication network 13, a high-precision map distribution device 14, an autonomous driving control device 15, an in-vehicle camera 16, a meter 17, a rear monitor 18, and a head-up display 19.

The in-vehicle equipment network 11 is a network that connects each device included in the in-vehicle system 40. The in-vehicle equipment network 11 may be either wired communication or wireless communication. There may be a single or a plurality of communication media or communication protocols. The in-vehicle equipment network 11 may be a large network in which a plurality of networks is connected to each other by gateway devices. The communication unit 4 of the navigation system 30 is connected to the in-vehicle equipment network 11 and can communicate with each device included in the in-vehicle system 40.

The external communication network 12 is a wireless communication network that communicates with an external device or server of the in-vehicle system 40. The external communication network 12 is, for example, a mobile communication carrier network. For example, the in-vehicle system 40 accesses a wireless communication device (wireless base station) installed on the road and communicates with the server via the mobile communication carrier network.

The inter-vehicle communication network 13 is a wireless communication network that communicates with another vehicle. For example, the in-vehicle system 40 receives information held by another vehicle using a predetermined communication protocol via the inter-vehicle communication network 13, and receives information held by the in-vehicle system 40 of the own vehicle C to another vehicle.

The high-precision map distribution device 14 is a device that distributes high-precision map information. The high-precision map information includes, for example, high-precision road shape information, and is used for driving operations that require high-precision map information, such as autonomous driving. The high-precision map distribution device 14 provides each device of the in-vehicle system 40 with the high-precision map information via the in-vehicle equipment network 11.

The autonomous driving control device 15 plans vehicle control necessary for the autonomous driving and generates a control signal, using information acquired from the in-vehicle camera 16 and various sensors mounted on the vehicle C, information acquired from the navigation system 30, and/or information acquired from the high-precision map distribution device 14.

The in-vehicle camera 16 is mounted on the vehicle C, captures a situation around the vehicle C, and generates a captured image. The in-vehicle camera 16 may have a visible light and/or infrared image capturing function. The in-vehicle camera 16 may have a function of recognizing the situation around the vehicle C from the captured image. For example, the in-vehicle camera 16 recognizes a position, shape, and type of a lane on the road, and/or a position and shape of another vehicle traveling nearby.

The meter 17 is mounted on the vehicle C and displays information such as the traveling speed of the vehicle C. The meter 17 may be achieved by displaying an image or may be achieved mechanically. The rear monitor 18 provides the occupant in a rear seat of the vehicle C with information. The rear monitor 18 includes, for example, a liquid crystal display. The head-up display 19 presents information to a front window of a driver or the occupant. The head-up display 19 includes, for example, a liquid crystal display.

A road information distribution system 20 distributes road information to the navigation system 30 via the external communication network 12. The road information includes, for example, road congestion status, road regulation information, and the like.

A nearby vehicle external communication device 21 is provided in the vehicle C, and provides another nearby vehicle with the information held by the vehicle C via the inter-vehicle communication network 13. Further, the communication unit 4 of the navigation system 30 of the vehicle C receives information held by nearby another vehicle transmitted from the nearby vehicle external communication device 21 included in the nearby another vehicle via the inter-vehicle communication network 13.

The navigation system 30 provides the occupant of the vehicle C with a navigation image. The navigation image is generated, for example, as follows. The controller 1 collects necessary information and stores the information in the temporary storage 3. Then, the controller 1 orders the drawing processor 2 to draw a navigation image. The drawing processor 2 draws and outputs a navigation image on the basis of various drawing element information stored in the temporary storage 3. Each piece of information included in the drawing element information is taken from one or a plurality of information sources.

For example, the drawing processor 2 uses information included in the drawing element information of the road, such as coordinate information indicating the road shape and/or information indicating a lane type of the road, to draw the road which is a part of the navigation image.

For example, the drawing processor 2 uses information included in the drawing element information of the building, such as the coordinate information indicating a position and shape of a building on a map, information indicating a height and outer shape of the building, and/or texture information indicating appearance of the building, to draw the building which is a part of the navigation image. Further, in order to draw each type of building (for example, commercial facility or public facility) in a different manner, the drawing element information of the building may include information indicating an attribute of the building.

For example, the drawing processor 2 uses information included in the drawing element information of a traffic regulation, such as information indicating a speed limit of each road link and/or information indicating a passage regulation such as one-way traffic, to draw information on the traffic regulation which is a part of the navigation image.

For example, the drawing processor 2 uses information included in the drawing element information of the course control, such as information indicating at which point the autonomous driving vehicle controls a course change, to draw information that is included as a part of the navigation image and indicates at which point the autonomous driving vehicle changes a course.

The display unit 6 displays the navigation image output from the drawing processor 2. This allows the occupant to see the navigation image displayed on the display. Further, another display device displays a navigation image transmitted via the communication unit 4 and the in-vehicle equipment network 11. Other display devices are, for example, the meter 17, the rear monitor 18, and the head-up display 19. In this case, another display device may display the navigation image by subjecting the navigation image to processing such as scaling, partial cropping, and/or filtering, depending on a size and shape of the display device.

Figure 2:
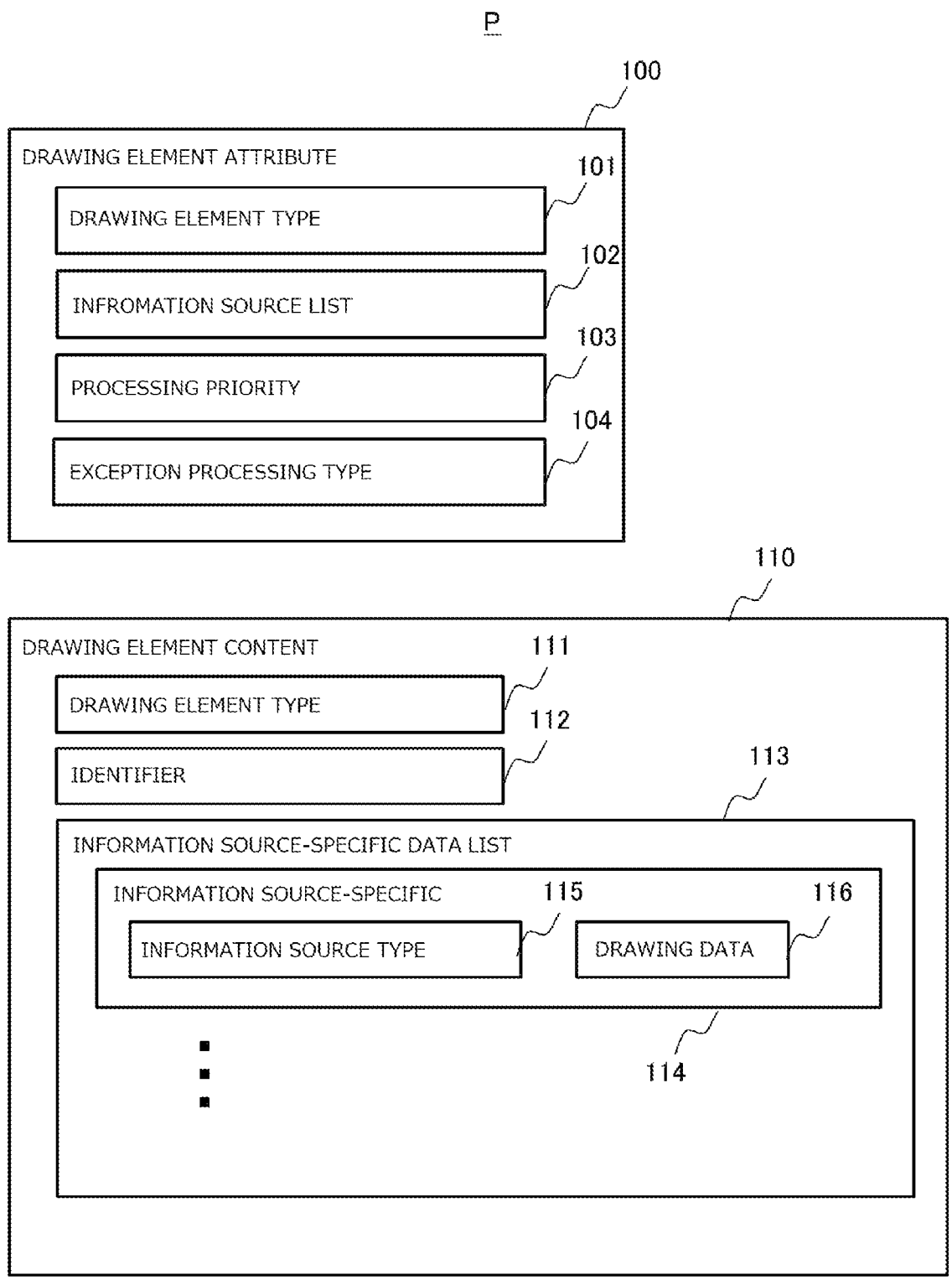
FIG. 2 is a diagram showing a format example of drawing element information P.

FIG. 2 shows an example of a format of the drawing element information P. Various drawing element information P is stored in the temporary storage 3 in accordance with this format.

The drawing element information P has a drawing element attribute 100 and a drawing element content 110.

The drawing element attribute 100 is attribute information defined for each type of drawing element information P. The drawing element attribute 100 has a drawing element type 101, an information source list 102, a processing priority 103, and an exception processing type 104.

The drawing element type 101 is information indicating the type of the drawing element information P corresponding to the drawing element attribute 100. The drawing element type 101 is, for example, a road element, a building element, a traffic regulation element, a traveling direction guide element, or the like.

The information source list 102 is information indicating a list of information sources necessary for configuring the drawing element information P. For example, the drawing element information P indicating a road shape includes the standard-precision map information 5, the high-precision map distribution device 14, and the in-vehicle camera 16 as the information source list 102.

The processing priority 103 is information indicating a priority of use of each information source by the drawing processor 2 when there is a plurality of information sources from which the same type of information can be acquired to be put into the information source list 102. For example, when the information acquired from a certain information source is temporarily or permanently unavailable for the target drawing element, the drawing processor 2 excludes the information source from a target of use and includes the information source of the highest priority among the other available information sources from which the same type of information as the unavailable information source can be acquired.

Figure 3:
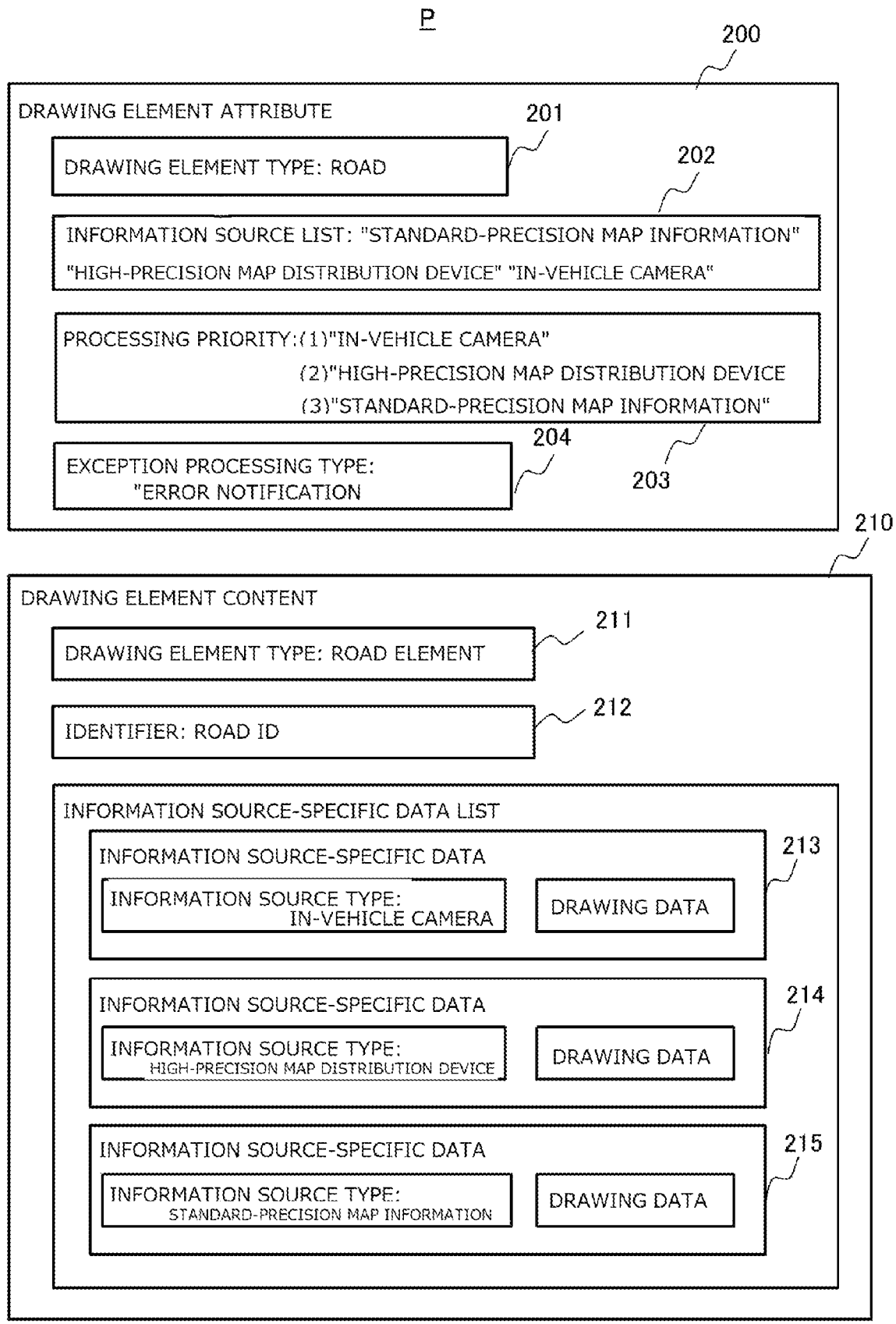
FIG. 3 is a diagram showing an example of the drawing element information P of a road element.

In the drawings according to the present embodiment, as shown in FIG. 3, the numbers (1), (2), and (3) are used to indicate the priority. In the present embodiment, the smaller the number, the higher the priority.

The exception processing type 104 is information indicating a method of processing the drawing element of a target of drawing when all the information sources in the information source list 102 are temporarily or permanently unavailable.

The drawing element content 110 is a format of a basic unit of drawing. The drawing element content 110 has a drawing element type 111, an identifier 112, and an information source-specific data list 113.

The drawing element type 111 is information indicating the type of the drawing element. The identifier 112 is information that can uniquely identify the drawing element. The information source data list 113 has information source-specific data 114 corresponding to each information source shown in the information source list 102.

The information source-specific data 114 is data necessary for drawing, and includes an information source type 115 and drawing data 116. The information source type 115 indicates an information source of the drawing data 116. The drawing data 116 is drawing data in a range corresponding to the identifier 112, which is collected from the information source of the information source type 115. That is, the information source-specific data 114 is unit information for drawing in the range corresponding to the identifier 112, which is collected from the information source specified by the information source type 115. For example, when the drawing element type 101 is a road element, the drawing processor 2 connects a plurality of drawing elements corresponding to line segments of the road in accordance with the drawing element content 110, and draws one road.

FIG. 3 shows an example of the drawing element information P of the road element.

A drawing element attribute 200 of the drawing element information P of the road element has, for example, the following information.

As a drawing element type 201, the drawing element attribute 200 has information indicating that the type of the drawing element attribute 200 is a "road element". As an information source list 202, the drawing element attribute 200 has information indicating that the standard-precision map information 5, the high-precision map distribution device 14, and the in-vehicle camera 16 are the information sources. As a processing priority 203, the drawing element attribute 200 has information indicating that a first priority is the in-vehicle camera 16, a second priority is the high-precision map distribution device 14, and a third priority is the standard-precision map information 5. As an exception processing type 204, the drawing element attribute 200 has information indicating "error notification generation".

The drawing element content 210 of the drawing element information P of the road element has, for example, the following information.

As the drawing element type 201, the drawing element content 210 has information indicating that the type of the drawing element content 210 is a "road element". As an identifier 212, the drawing element content 210 has a road ID that can uniquely identify the road. This road ID may follow a management method in the standard-precision map information 5 or the high-precision map distribution device 14.

In information source-specific data 213, the drawing element content 210 has information indicating the in-vehicle camera 16 as the information source type 115, and information indicating the road shape and the lane type in a range corresponding to the road ID, which is the information recognized by the in-vehicle camera 16, as the drawing data 116.

In information source-specific data 214, the drawing element content 210 has information indicating the high-precision map distribution device 14 as the information source type 115, and information indicating, with high precision, the road shape and the lane type for each lane in the range corresponding to the road ID, which is the information received from the high-precision map distribution device 14, as the drawing data 116.

In information source-specific data 215, the drawing element content 210 has information indicating the standard-precision map information 5 as the information source type 115, and information indicating a rough shape of the road in the range corresponding to the road ID, which is the information received from the standard-precision map information 5, as the drawing data 116.

Figure 4:
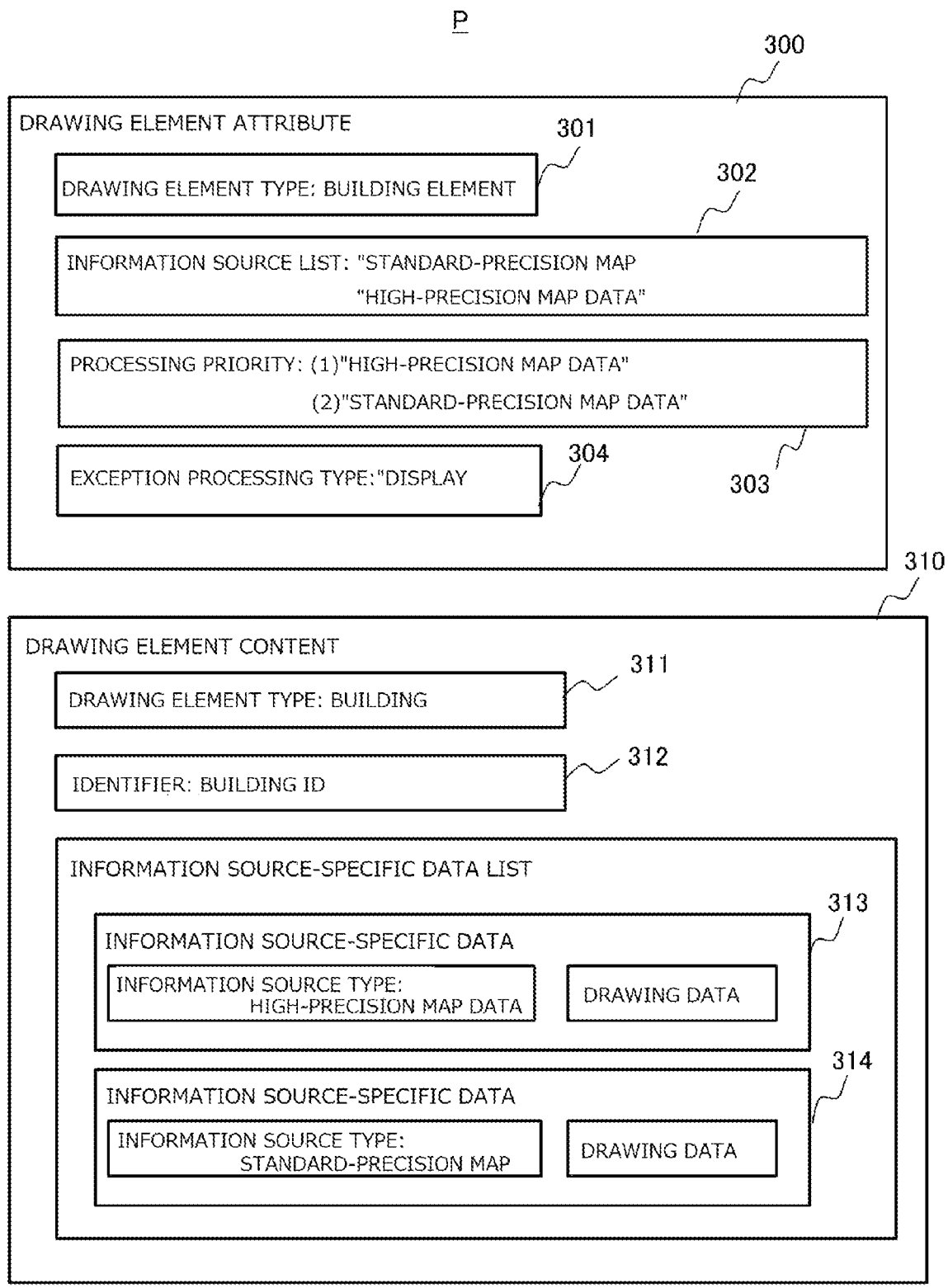
FIG. 4 is a diagram showing an example of the drawing element information P of a building element.

FIG. 4 shows an example of the drawing element information P of the building element.

A drawing element attribute 300 of the drawing element information P of the building element has, for example, the following information.

As a drawing element type 301, the drawing element attribute 300 has information indicating that the type of the drawing element attribute 300 is a "building element". As an information source list 302, the drawing element attribute 300 has information indicating that the standard-precision map information 5 and the high-precision map distribution device 14 are the information sources. As the processing priority 303, the drawing element attribute 300 has information indicating that a first priority is the high-precision map distribution device 14, and a second priority is the standard-precision map information 5. As an exception processing type 304, the drawing element attribute 300 has information indicating "display skip".

The drawing element content 310 of the drawing element information P of the building element has, for example, the following information.

As the drawing element type 301, the drawing element content 310 has information indicating that the type of the drawing element content 210 is a "building element". As an identifier 312, the drawing element content 310 has a building ID that can uniquely identify the building. This building ID may follow the management method in the standard-precision map information 5 or the high-precision map distribution device 14.

In information source-specific data 313 by information source, the drawing element content 310 has information indicating the high-precision map distribution device 14 as the information source type 115, and information on the type and shape of the building corresponding to the building ID, which is the information received from the high-precision map distribution device 14, as the drawing data 116.

In information source-specific data 314, the drawing element content 310 has information indicating the standard-precision map information 5 as the information source type 115, and information on the shape and type of the building corresponding to the building ID, which is the information received from the standard-precision map information 5, as the drawing data 116.

Figure 5:
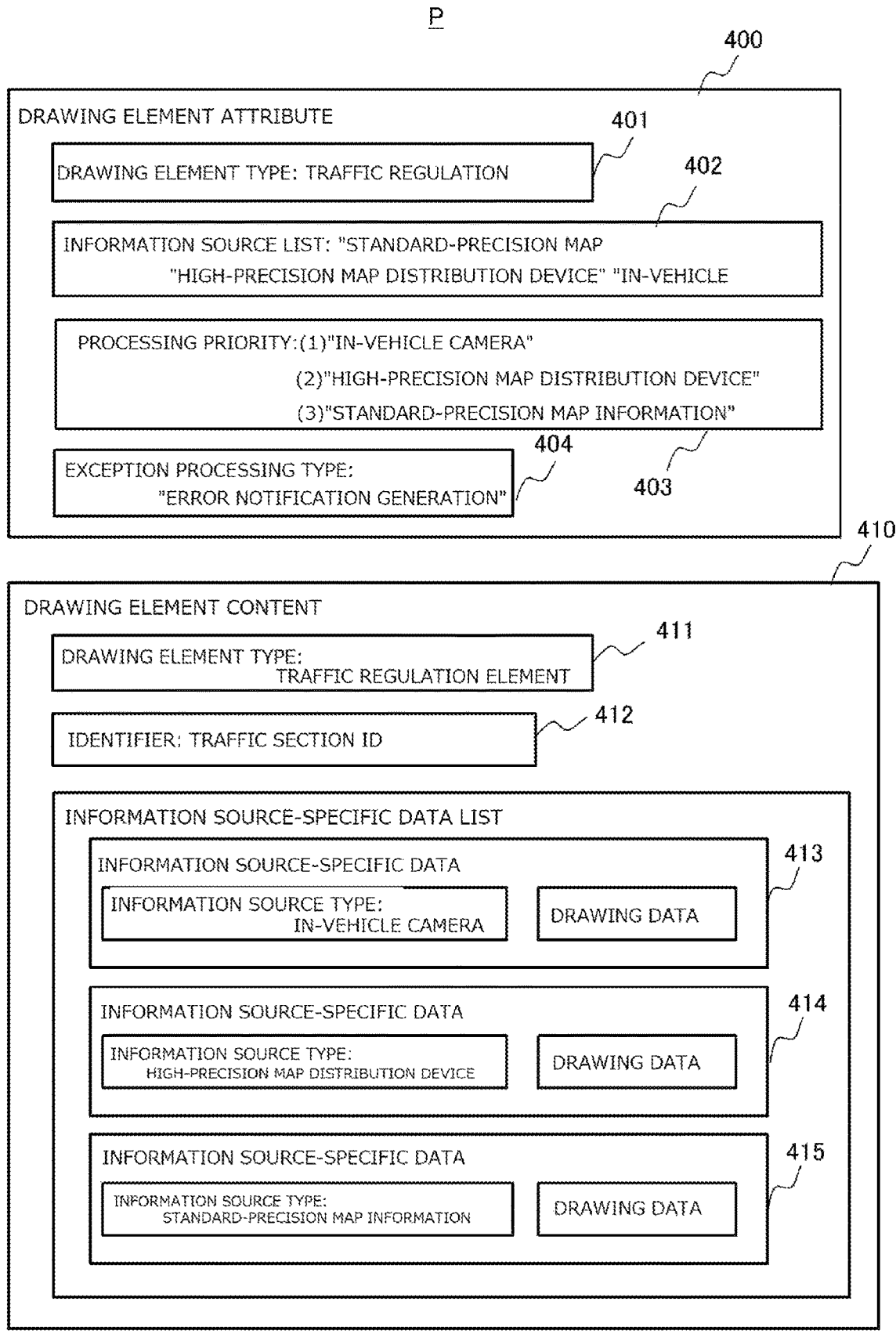
FIG. 5 is a diagram showing an example of the drawing element information P of a traffic regulation element.

FIG. 5 shows an example of the drawing element information of a traffic regulation element.

A drawing element attribute 400 of the drawing element information P of the traffic regulation element has, for example, the following information.

As a drawing element type 401, the drawing element attribute 400 has information indicating that the type of the drawing element attribute 400 is a "traffic regulation element". As an information source list 402, the drawing element attribute 400 has information indicating that the standard-precision map information 5, the high-precision map distribution device 14, and the in-vehicle camera 16 are the information sources. As a processing priority 403, the drawing element attribute 400 has information indicating that a first priority is the in-vehicle camera 16, a second priority is the high-precision map distribution device 14, and a third priority is the standard map information 5. As an exception processing type 404, the drawing element attribute 400 has information indicating "error notification generation".

The drawing element content 410 of the drawing element information P of the traffic regulation element has, for example, the following information.

As the drawing element type 401, the drawing element content 410 has information indicating that the type of the drawing element content 410 is a "traffic regulation element".

As an identifier 412, the drawing element content 410 has a regulated section ID that can uniquely identify traffic regulation information. This regulated section ID may follow the management method in the standard-precision map information 5 or the high-precision map distribution device 14.

In information source-specific data 413, the drawing element content 410 has information indicating the in-vehicle camera 16 as the information source type 115, and the traffic regulation information in a range corresponding to the regulated section ID, which is the information recognized from a sign by the in-vehicle camera 16, as the drawing data 116.

In information source-specific data 414, the drawing element content 410 has information indicating the high-precision map distribution device 14 as the information source type 115, and the traffic regulation information in the range corresponding to the regulated section ID, which is the information received from the high-precision map distribution device 14, as the drawing data 116.

In information source-specific data 415, the drawing element content 410 has information indicating the standard-precision map information 5 as the information source type 115, and the traffic regulation information in the range corresponding to the regulated section ID, which is the information received from the standard-precision map information 5, as the drawing data 116.

Figure 6:
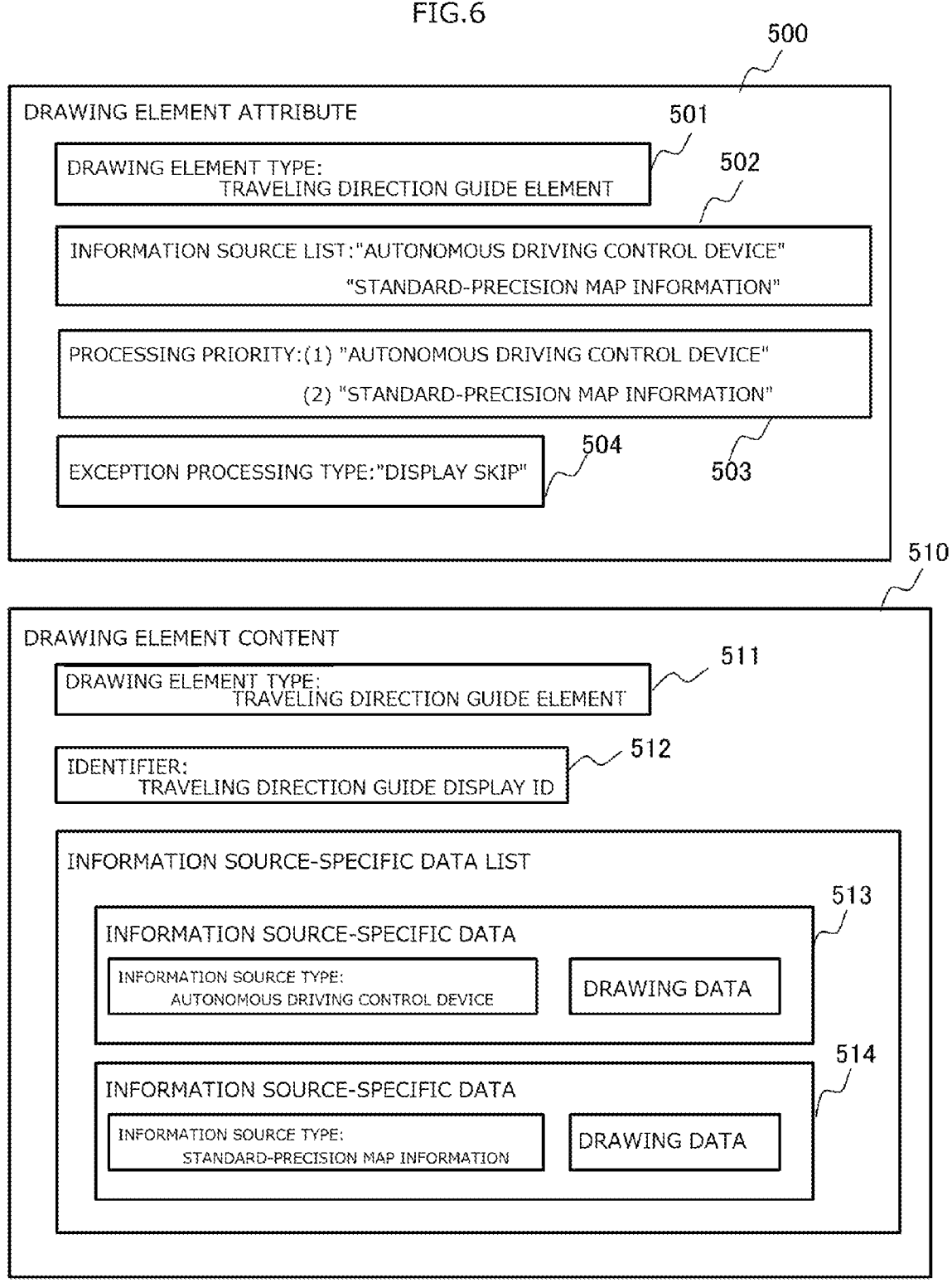
FIG. 6 is a diagram showing an example of the drawing element information P of a traveling direction guide element.

FIG. 6 is an example of the drawing element information of a traveling direction guide element.

A drawing element attribute 500 of the drawing element information P of the traveling direction guide element has, for example, the following information.

As a drawing element type 501, the drawing element attribute 500 has information indicating that the type of the drawing element attribute 500 is a "traveling direction guide element". As an information source list 502, the drawing element attribute 500 has information indicating that the autonomous driving control device 15 and the standard-precision map information 5 are the information sources. As a processing priority 503, the drawing element attribute 500 has information indicating that a first priority is the autonomous driving control device 15 and a second priority is the standard-precision map information 5. As an exception processing type 504, the drawing element attribute 500 has information indicating "display skip".

The drawing element content 510 of the drawing element information P of the traveling direction guide element has, for example, the following information.

As the drawing element type 501, the drawing element content 510 has information indicating that the type of the drawing element attribute 500 is a "traveling direction guide element". As an identifier 512, the drawing element content 510 has a traveling direction guide ID that can uniquely identify the traveling direction guide. This traveling direction guide ID may follow a management method in the autonomous driving control device 15.

In information source-specific data 513, the drawing element content 510 has information indicating the autonomous driving control device 15 as the information source type 115, and information indicating the traveling direction guide corresponding to the traveling direction guide ID, as the drawing data 116. The information indicating the traveling direction guide is, for example, information indicating a right/left turn during autonomous driving, coordinate information indicating a point of lane change, relative position information, or the like.

In information source-specific data 514, the drawing element content 510 has information indicating the standard-precision map information 5 as the information source type 115, and information for guiding the traveling direction in accordance with route information corresponding to the traveling direction guide ID, as the drawing data 116. The route information may be calculated in advance using the standard-precision map information 5.

Next, a method of generating a navigation image by using the drawing element information P will be described.

Figure 7:
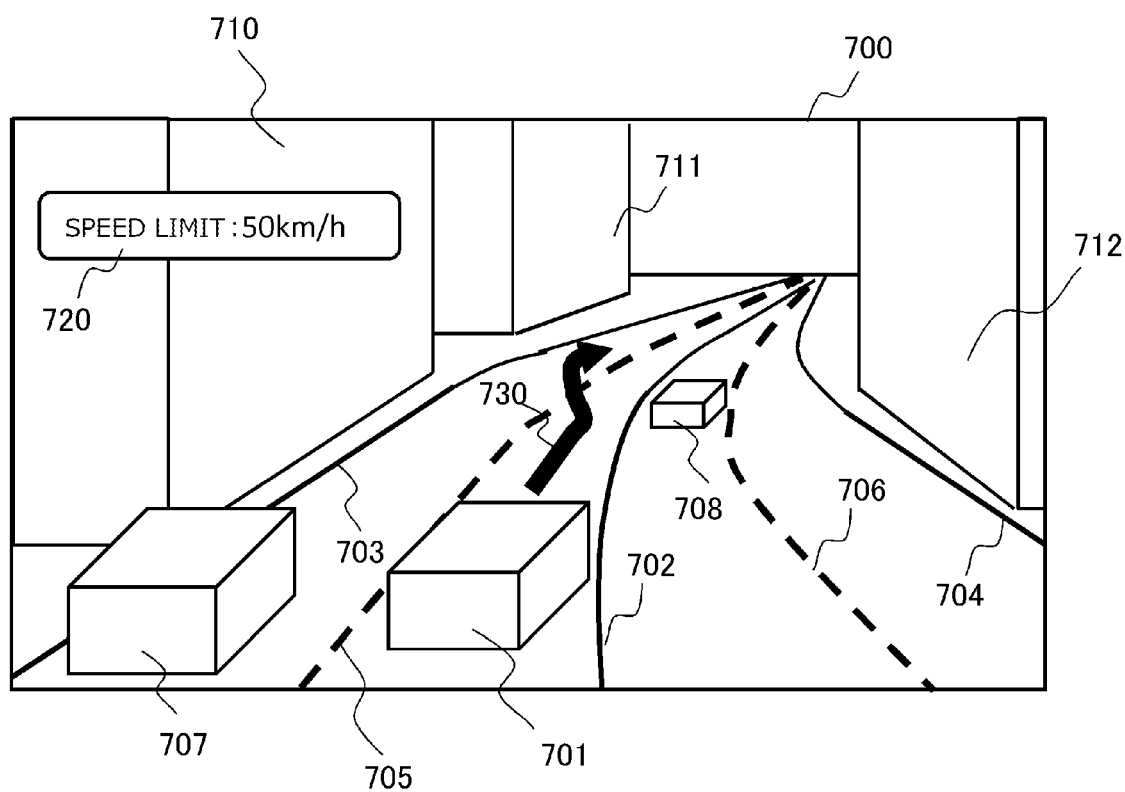
FIG. 7 is a diagram showing an example of a navigation image.

FIG. 7 is an example of a navigation image 700. Next, the drawing elements contained in the navigation image 700 shown in FIG. 7 will be described.

An own vehicle image 701 is an image showing a position of the own vehicle (vehicle C) on the image. A center line image 702 is an image showing a center line of the road on which the own vehicle is traveling. A left line image 703 is an image showing a left line of the road on which the own vehicle is traveling. A right line image 704 is an image showing a right line of the road on which the own vehicle is traveling.

A left lane separation line image 705 is an image showing a left lane separation line of the road on which the own vehicle is traveling. A right lane separation line image 706 is an image showing a right lane separation line of the road on which the own vehicle is traveling.

A left nearby vehicle image 707 is an image showing a vehicle traveling on a left side of the own vehicle. An opposite nearby vehicle image 708 is an image showing a vehicle traveling in an opposite lane. A building image 710, a building image 711, and a building image 712 are images of buildings near the own vehicle. Traffic regulation information 720 is an image showing information on the regulation of the road on which the own vehicle is traveling.

Figure 8:
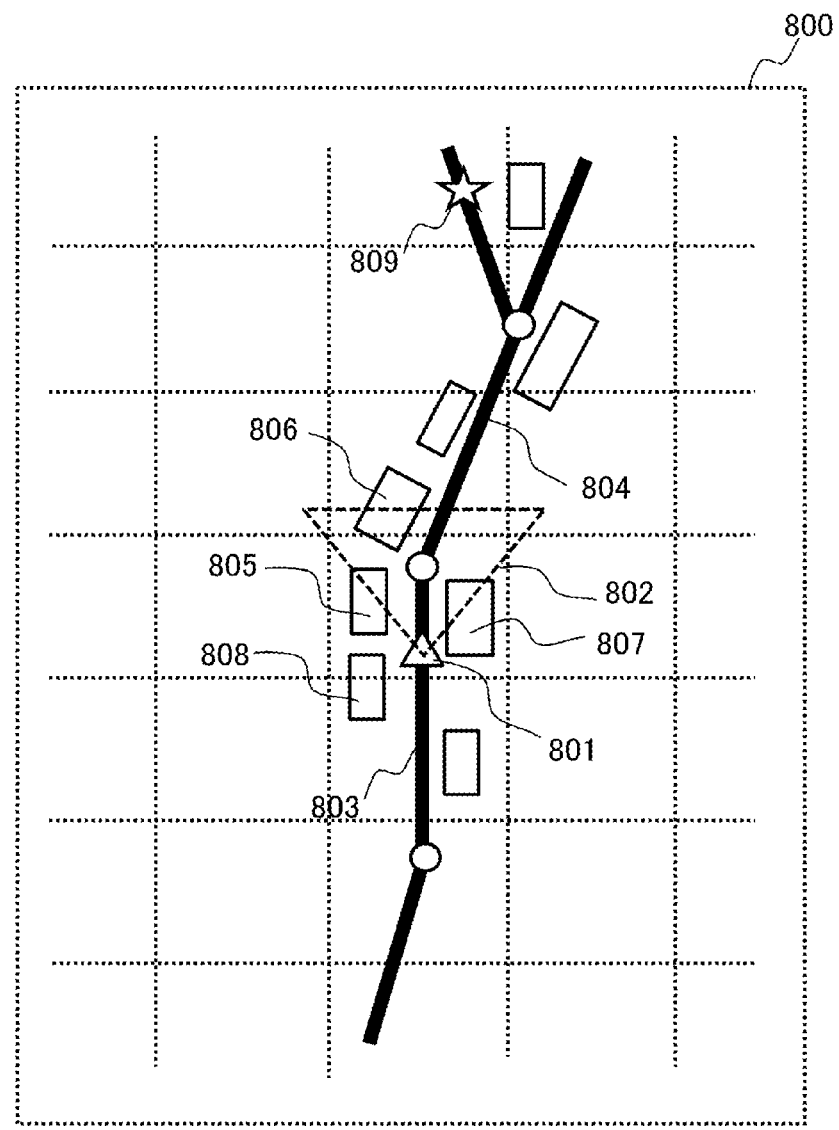
FIG. 8 is a diagram showing an example of map information around an own vehicle.

FIG. 8 shows an example of map information referenced to generate the navigation image 700 shown in FIG. 7.

Map information 800 is map information near the own vehicle (vehicle C). The map information 800 is configured on the basis of the standard-precision map information 5 and the high-precision map information acquired from the high-precision map distribution device 14.

An own vehicle position 801 is a coordinate indicating the position of the own vehicle (vehicle C) calculated by the vehicle position calculator 8. A drawing range 802 is information indicating a certain range of a field of view in front of the own vehicle position 801. The drawing element included in the drawing range 802 is a target of drawing of the navigation image.

A road link 803 is a line segment of the road on which the own vehicle (vehicle C) is traveling, which is included in the drawing range 802. A unit of this line segment is defined in accordance with a format of the standard-precision map information 5. A road link 804 is a line segment of the road included in the drawing range 802. A unit of this line segment is defined in accordance with a format of the standard-precision map information 5.

A building 805, a building 806, and a building 807 are information of buildings included in the drawing range 802. A building 808 is information on a building that is not included in the drawing range 802.

A destination 809 is information indicating a destination in the route information generated in advance on the basis of the standard-precision map information 5.

Figure 9:
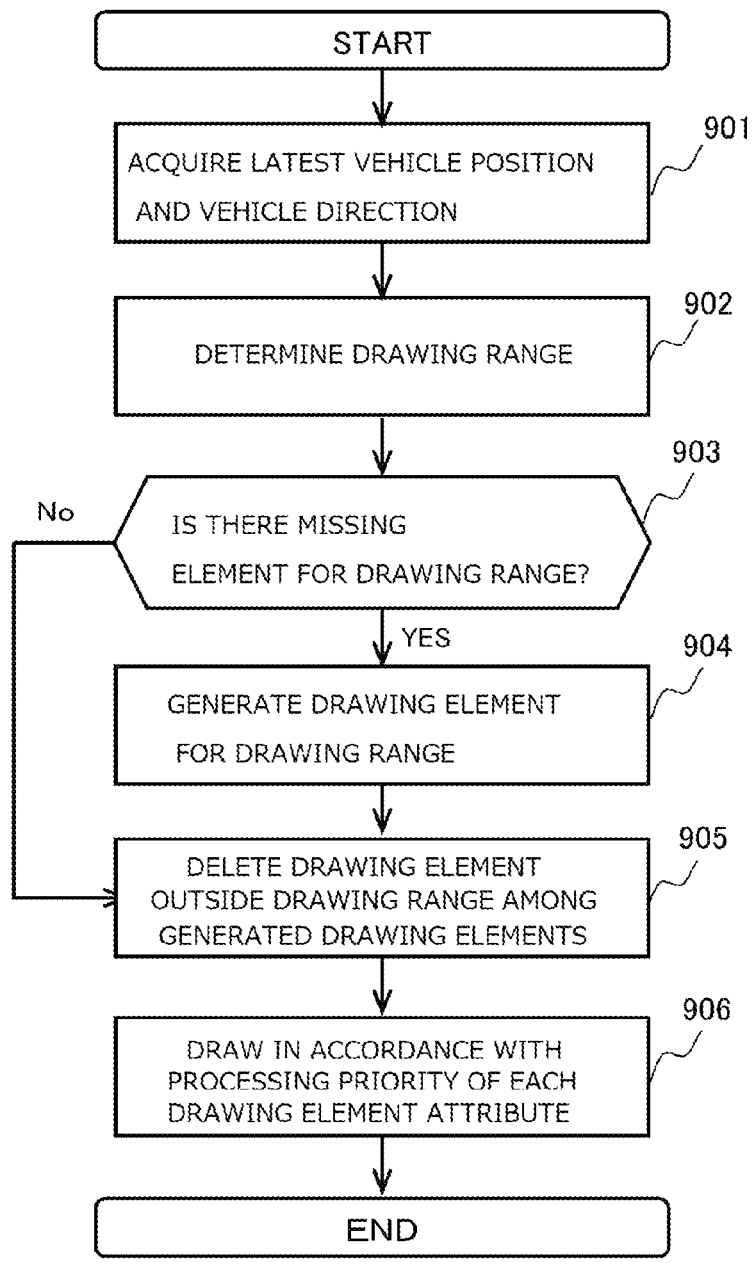
FIG. 9 is a flowchart showing a processing example according to the first embodiment.

FIG. 9 is a flowchart showing an example of a process of generating the navigation image 700 according to the first embodiment. The controller 1 performs processing shown in FIG. 9 in accordance with the program recorded in the storage 10.

Step 901: The controller 1 acquires the current position of the vehicle C and an orientation of the vehicle C calculated by the vehicle position calculator 8.

Step 902: The controller 1 determines the drawing range 802 on the basis of the current position of vehicle C and the orientation of vehicle C.

Step 903: The controller 1 refers to the drawing elements that have been generated and determines whether there is a missing drawing element for drawing the drawing range 802. The processing proceeds to step 904 when there is a missing drawing element, and proceeds to step 905 when there is no missing drawing element.

Step 904: When there is a drawing element that is required for drawing the drawing range 802 but has not been generated, the controller 1 collects information from each information source described in the information source list 102 with reference to each type of information source list 102 and stores the information in the temporary storage 3 as the drawing data 116. For example, the controller 1 sets the ID of the road link 803 and the ID of the road link 804 in the map information 800 shown in FIG. 8 to the identifiers 212, and generates two drawing elements 210. Further, the controller 1 generates the drawing element 310 for each of the building 805, the building 806, and the building 807 included in the drawing range 802. Further, the controller 1 generates the drawing element 410 on the basis of the regulation information corresponding to the road link 803 in which the vehicle C is traveling. In addition, the controller 1 generates the drawing element 510 on the basis of the latest information acquired from the autonomous driving control device 15.

Step 905: When the drawing element outside the drawing range 802 exists as the drawing element that has been generated, the controller 1 deletes the drawing element outside the drawing range 802 from the temporary storage 3. That is, the controller 1 deletes unnecessary drawing elements from the temporary storage 3.

Step 906: The controller 1 orders the drawing processor 2 to do the following. That is, the drawing processor 2 refers to the processing priority 103 of the drawing element attribute 100 to which the drawing element belongs for each drawing element of a target of drawing, and draws using the drawing data 116 corresponding to the information source having a high priority.

The controller 1 generates the navigation image 700 by repeating the processing shown in FIG. 9 at a predetermined cycle. For example, the controller 1 can express the navigation image 700 like an animation by repeating the processing shown in FIG. 9 at a sufficiently high speed to human vision.

Figure 10:
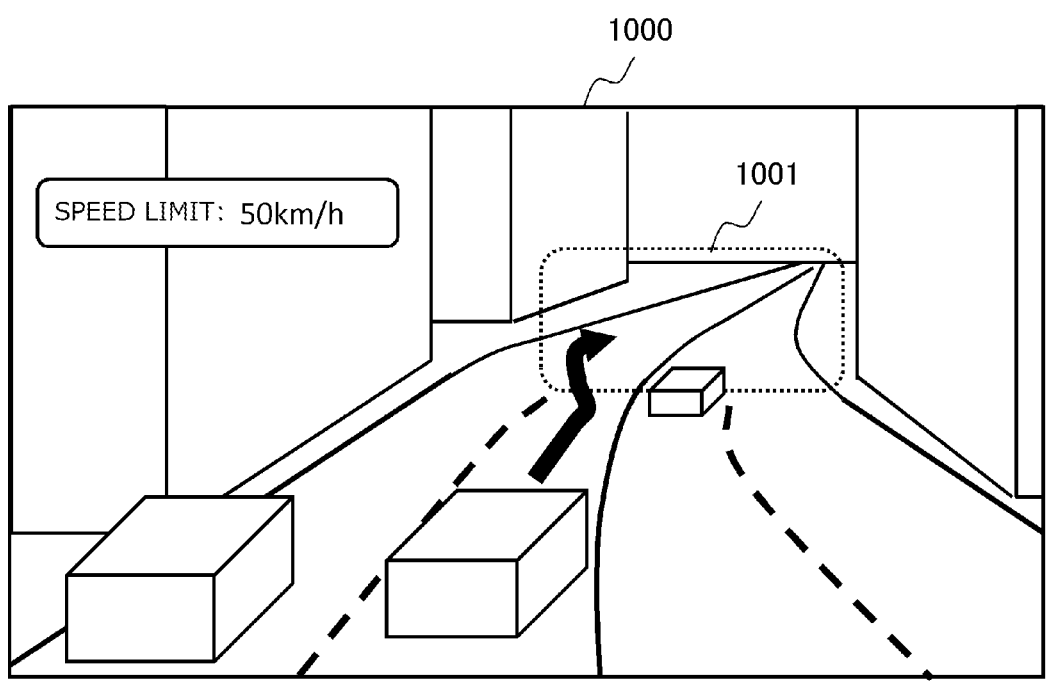
FIG. 10 is a diagram showing an example of the navigation image when a high-precision map distribution device is unavailable.

FIG. 10 shows an example of a navigation image 1000 when the high-precision map distribution device 14 is unavailable.

When the high-precision map distribution device 14 is unavailable, the controller 1 cannot use the road shape information for each lane included in the high-precision map information. In this case, the navigation image 1000 shown in FIG. 10 does not display a distant lane as shown in a lane non-display section 1101 as compared with the navigation image 700 shown in FIG. 7. In this case, the other parts of the navigation image 1000 may be drawn in the same manner as the navigation image 700 shown in FIG. 7.

The navigation image 1000 shown in FIG. 10 is generated by transforming a part of the processing shown in FIG. 9 as follows. That is, in step 906, when the high-precision map distribution device 14 is not available, the controller 1 continues the drawing including the lane with reference to the drawing data 116 corresponding to the in-vehicle camera 16 in the drawing element 210 near the vehicle C. On the other hand, the controller 1 cannot refer to both the high-precision map distribution device 14 and the in-vehicle camera 16 for the drawing element 210 which is relatively far from the vehicle C and is outside a recognition range of the in-vehicle camera 16, the controller 1 draws with reference to the standard-precision map information 5. Because the standard-precision map information 5 does not include lane level information, the controller 1 does not draw a lane in the lane non-display section 1101.

In this way, the controller 1 acquires the drawing data 116 from each information source on the basis of the processing priority 103, and determines how to use the acquired drawing data 116 for each drawing element 110. As a result, the navigation system 30 can continue to provide the navigation image without major failure even when some information sources are not available.

Second Embodiment

In a second embodiment, an example in which the controller 1 manages an information source state on the basis of an information source state management table will be described. Other configurations may be similar to those in the first embodiment.

FIG. 11 shows an example of an information source state management table 600. The information source state management table 600 is a table for managing the information source state. The information source state management table 600 shows, as data items, a condition number 601, a position information state 602, a standard-precision map information state 603, a high-precision map distribution device state 604, an in-vehicle camera state 605, and an autonomous driving device state 606, and a drawing policy 607.

The condition number 601 is a number for distinguishing each condition. The position information state 602 is information indicating whether the controller 1 can acquire own vehicle position information from the vehicle position calculator 8.

The standard-precision map information state 603 is information indicating whether the controller 1 can acquire information necessary for drawing from the standard-precision map information 5. The high-precision map distribution device state 604 is information indicating whether the controller 1 can acquire information necessary for drawing from the high-precision map distribution device 14.

The in-vehicle camera state 605 is information indicating whether the controller 1 can acquire information necessary for drawing from the in-vehicle camera 16. The autonomous driving device state 606 is information indicating whether the controller 1 can acquire information necessary for drawing from the autonomous driving control device 15.

The drawing policy 607 is information indicating a drawing policy of the navigation image when a combination of conditions of each state matches a current state. For example, a drawing policy "A" indicates a drawing policy for determining the priority for each drawing element, as in the first embodiment. A drawing policy "B" indicates a drawing policy for drawing the traveling direction guide using the route information calculated from the standard-precision map information 5, instead of the information acquired from the autonomous driving control device 15, even when the information can be acquired from the autonomous driving control device 15. A drawing policy "C" indicates a drawing policy for drawing using only the information from the in-vehicle camera 16. A drawing policy "D" indicates a drawing policy for drawing an error notification screen without performing normal drawing because it is difficult to continue drawing. A drawing policy E indicates a drawing policy to determine that the information is insufficient due to a temporary communication failure, wait for a certain period of time without drawing the drawing element of a target of drawing, and wait for the acquisition of the missing information.

Figure 12:
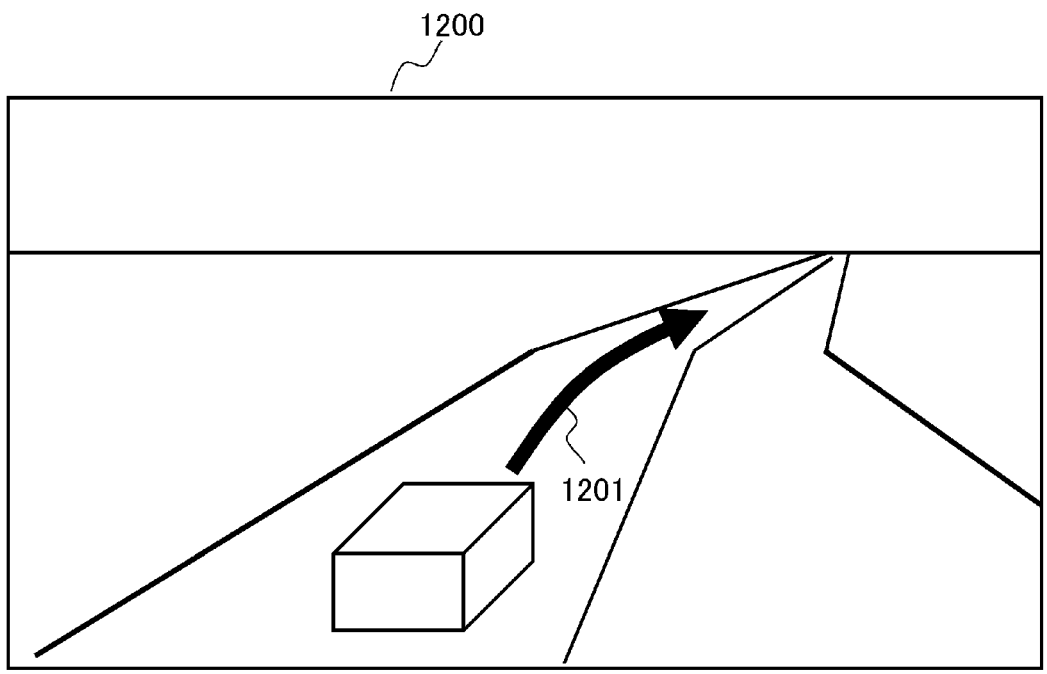
FIG. 12 is a diagram showing an example of a navigation image according to the second embodiment when a high-precision map distribution device and an in-vehicle camera are unavailable.

FIG. 12 shows an example of a navigation image 1200 when the high-precision map distribution device 14 and the in-vehicle camera 16 are unavailable at the same time as the information sources in the navigation system 30 according to the second embodiment.

Figure 13:
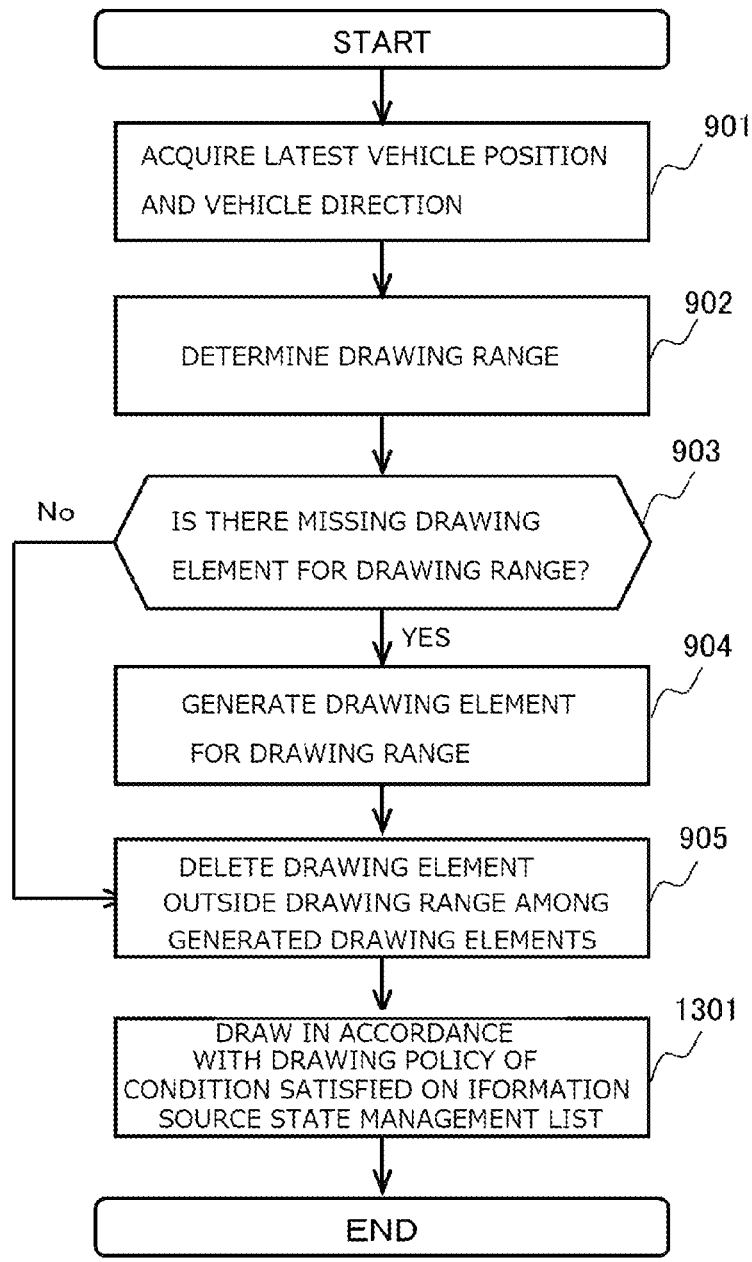
FIG. 13 is a flowchart showing a processing example according to the second embodiment.

FIG. 13 is a flowchart showing a processing example for generating a navigation image (for example, FIG. 12) according to the second embodiment. The controller 1 according to the second embodiment performs processing shown in FIG. 13 instead of the processing shown in FIG. 9.

The controller 1 according to the second embodiment performs the processing of steps 901 to 905 shown in FIG. 9. Then, the controller 1 executes the process of the next step 1301 instead of the processing of step 906 shown in FIG. 9.

In step 1301, the controller 1 searches for a pattern that matches the conditions with reference to the information source state management table 600. For example, when the high-precision map distribution device 14 and the in-vehicle camera 16 are unavailable at the same time, the condition number 601 "7" is satisfied in the information source state management table 600 shown in FIG. 11. Therefore, in this case, the controller 1 selects the drawing policy 607 "B". The drawing policy "B" is a drawing policy that the traveling direction guide is not drawn on the basis of the information acquired from the autonomous driving control device 15.

The controller 1 performs the same processing as in step 906 for the other drawing elements. Further, because the detailed shape cannot be acquired for drawing the road, the controller 1 draws the road with the precision that can be acquired from the standard-precision map information 5.

When the map information necessary for high-precision drawing is missing, even if detailed traveling directions such as lane movement acquired from the autonomous driving control device 15 are drawn as shown in FIG. 10, the precision of the information will not match the map drawing. It is therefore not possible to provide useful information. On the other hand, in the above processing, as illustrated in FIG. 12, when the map information necessary for high-precision drawing is missing, the traveling direction guide is not drawn as shown in drawing 1201. Therefore, in the present embodiment, it is possible to avoid a non-uniform display that cannot provide useful information and to provide a unified display.

Figure 14:
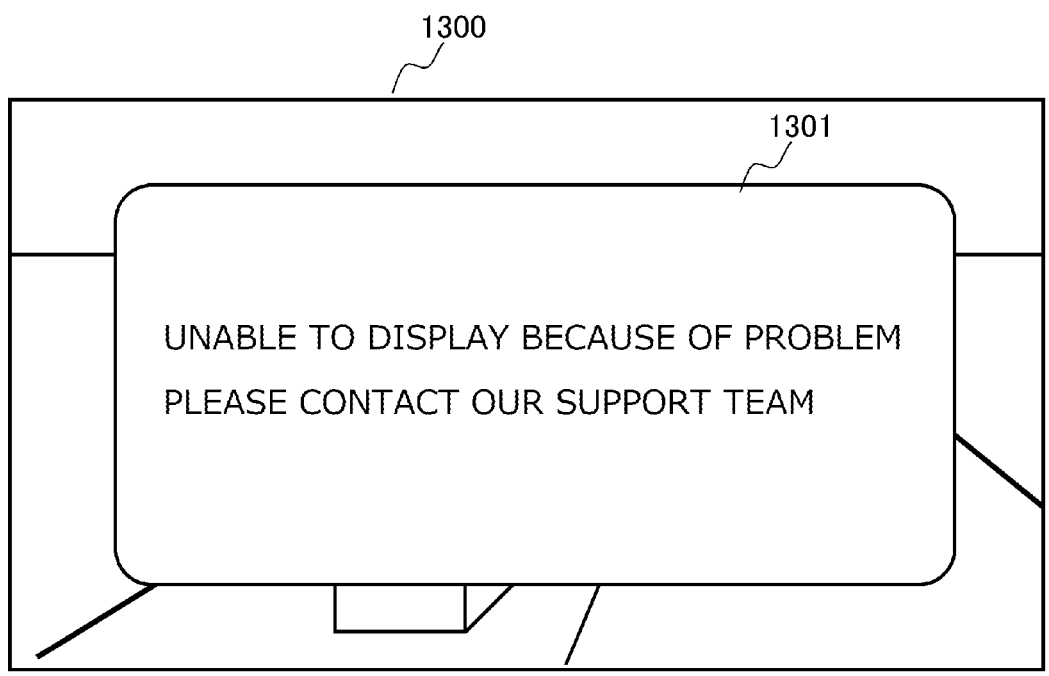
FIG. 14 is a diagram showing an example of the navigation image according to the second embodiment when the high-precision map distribution device, the in-vehicle camera, and standard-precision map information are unavailable.

FIG. 14 shows an example of the navigation image 1300 when the high-precision map distribution device 14, the in-vehicle camera 16, and the standard-precision map information 5 are unavailable at the same time as the information sources when the present embodiment is applied.

When the high-precision map distribution device 14, the in-vehicle camera 16, and the standard-precision map information 5 are unavailable at the same time, the controller 1 selects the drawing policy 607 "D" corresponding to the condition number 601 "13" in the processing of step 1301. The drawing policy "D" is a drawing policy for drawing an error display 1301 without performing the drawing process of each element. As a result, when it is difficult to provide useful information, the error status can be notified to the occupant without performing unnecessary drawing.

Figure 15:
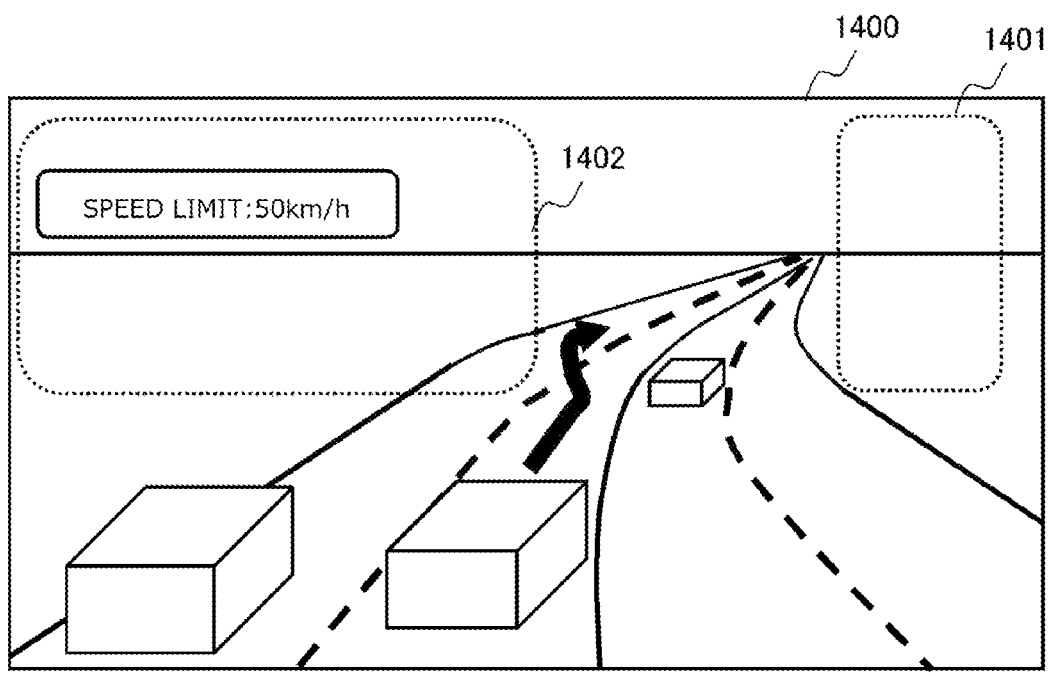
FIG. 15 is a diagram showing an example of the navigation image according to the second embodiment when the information of the high-precision map distribution device is unavailable due to a temporary delay.

FIG. 15 shows an example of a navigation image 1400 when the information of the high-precision map distribution device 14 is unavailable as the information source due to a temporary delay when the present embodiment is applied.

For example, the information of the high-precision map distribution device 14 can be referred to for the drawing element contents 210, 410, and 510 except for the drawing element content 310. However, when the information of the high-precision map distribution device 14 cannot be temporarily acquired for the drawing element content 310, the controller 1 selects the drawing policy 607 "E" corresponding to the condition number 601 "17" in the processing of step 1301.

As shown in the navigation image 1400 in FIG. 15, the controller 1 does not draw the building for a route display 1401 and a route display 1402 for a certain period of time as compared with the navigation image 1000 in accordance with the drawing policy "E". When the information of the high-precision map distribution device 14 becomes available after a certain period of time, the controller 1 executes the processing shown in FIG. 13. As a result, the controller 1 can select the condition number 601 "1" in the processing of step 1301 and display the navigation image 1000 shown in FIG. 7.

If the controller 1 does not follow the drawing policy E, but follows the processing priority 303, and draws a building with standard precision for the route display 1401 and the route display 1402 using the standard-precision map information 5, the information of the high-precision map distribution device 14 becomes available after the building with standard precision is once drawn, and then the building with high precision is to be re-drawn. If the drawing precision of the building shape is switched in a short time, the building shape may appear to have changed to the viewer of the navigation image.

In contrast, as shown in the present embodiment, when it is assumed that the acquisition of information from the high-precision map distribution device 14 is slightly delayed, applying the drawing policy "E" can avoid a situation where the shape of a target of drawing changes in a short time and the viewer of the navigation image is confused.

In this way, performing the drawing process using the information source state management table 600 can avoid unnatural drawing under specific conditions and achieve natural drawing as compared with a case where drawing is performed using only the processing priority 103. Further, it is possible to determine with high accuracy whether it is difficult to continue drawing and generate a navigation image.

Third Embodiment

In a third embodiment, there will be described that the first embodiment and the second embodiment can be achieved when the navigation system 30 has a built-in function corresponding to the high-precision map distribution device 14 and when a communication control device 23 is used to achieve an external communication function.

Figure 16:
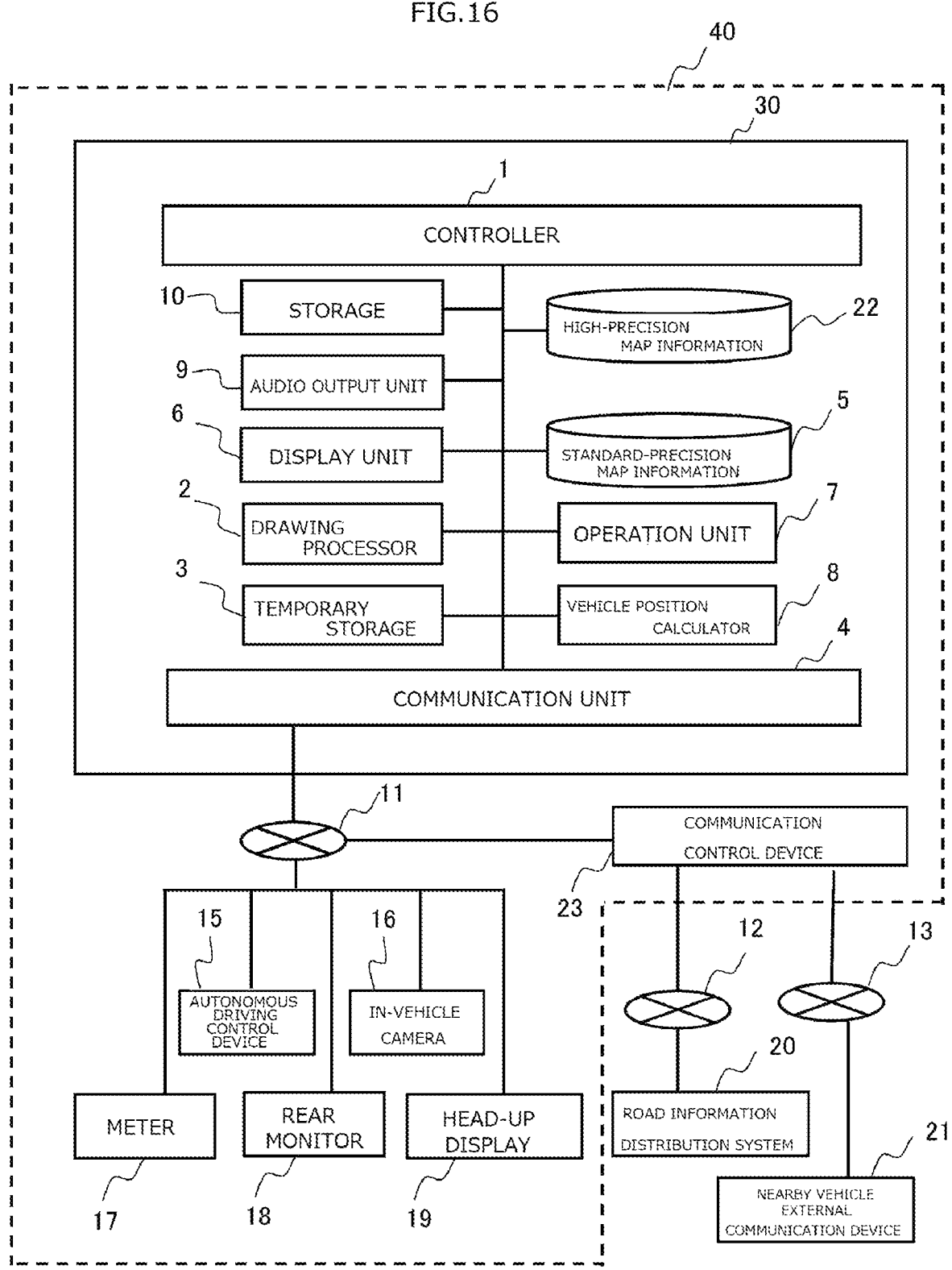
FIG. 16 is a diagram showing a configuration example of a navigation system according to a third embodiment.

FIG. 16 shows a configuration example of the navigation system 30 according to the third embodiment. In FIG. 16, the navigation system 30 has the built-in function corresponding to the high-precision map distribution device 14, and achieves the external communication function by using the communication control device 23. Hereinafter, only differences from the configuration shown in FIG. 1 will be described.

The high-precision map information 22 is high-precision map information equivalent to that provided by the high-precision map distribution device 14 in FIG. 1. By changing a designation of a reference destination in the drawing element attribute 100 and the drawing element content 110 from the high-precision map distribution device 14 to the high-precision map information 22, the processing equivalent to the first embodiment can be achieved.

Further, the controller 1 refers to the high-precision map information 22 and provides the device connected to the in-vehicle device network 11 with the function equivalent to the high-precision map distribution device 14. This makes it possible to absorb the difference in the configuration between FIG. 1 and FIG. 16.

The communication control device 23 is connected to the in-vehicle device network 11 and mediates communication with the external communication network 12 and the inter-vehicle communication network 13. The communication unit 4 communicates with the communication control device 23 via the in-vehicle device network 11 and can acquire communication information equivalent to the communication information in the first embodiment or the second embodiment.

In the configuration illustrated in FIG. 16, the processing described in the first embodiment or the second embodiment can be achieved without changing the procedure, and a similar effect to the effect of the first embodiment or the second embodiment can be obtained. Further, the high-precision map distribution device 14, which is built in the navigation system 30, can reduce a hardware cost while the similar effect can be obtained. In addition, by using the communication control device 23, the communication function can be shared by the devices connected to the in-vehicle device network 11 while the similar effect can be obtained.

SUMMARY

Part or all of the above embodiments may be summarized as follows. However, the present invention is not limited thereto.

The navigation system 30 that displays an image on the display and presents the image to the occupant of the vehicle has the drawing processor 2 that draws an image on the display, the temporary storage 3 that holds data for generating an image, and the controller 1 that displays the image on the display using the drawing processor 2 and the temporary storage 3. The controller 1 acquires data for generating the drawing elements from at least one information source for each drawing element included in the image, stores the data in the temporary storage 3, and selects data based on the information source determined in accordance with a predetermined setting from among normal available data stored in the temporary storage 3, and causes the drawing processor 3 to draw an image combining the drawing elements based on the selected data.

As a result, the navigation system 30 displays on the display an image in which drawing elements based on data from the information source selected according to a predetermined setting are combined, and thus an appropriate image can be displayed depending on the situation.

The above setting may be the processing priority 103 that ranks the information sources. Then, the controller 1 may acquire data from the information source determined in accordance with the processing priority 103 from the temporary storage 3.

As a result, the controller 1 selects the data for generating the drawing element in accordance with the processing priority 103, and thus can display an image using the available and high-priority data.

The above setting may be the information source state management table 600 showing each state of a plurality of information sources and a method of selecting an information source corresponding to a combination of each state. Then, the controller 1 may acquire the state of each of the plurality of information sources, select the information source corresponding to the combination of states in accordance with the information source state management table 600, and acquire the data from the selected information source from the temporary storage.

As a result, the controller 1 selects the data for generating the drawing element in accordance with the state of the information source, and thus can display an image using available and suitable data.

When the normal data cannot be temporarily acquired from the information source of the data that has been used for generating the drawing element, the controller 1 may use, until a predetermined time elapses, the normal data already acquired from the information source of the data that has been used, so far, for generating drawing element. After the predetermined time has elapsed, the controller 1 may use the data from the information source determined in accordance with the above setting.

As a result, when the data from the information source in use cannot be acquired only for a short time, the controller 1 continues to display the image by the drawing element generated by the normal data already acquired from the information source in use. It is therefore possible to prevent a mode of the image on the display from being frequently switched in a short time.

The information sources include a standard-precision map used to calculate a route to a destination and a high-precision map having map information with higher precision than the standard-precision map. Then, the above setting may be performed such that the high-precision map is preferentially selected over the standard-precision map.

As a result, the controller 1 preferentially selects the high-precision map when a high-precision map with higher precision than the standard-precision map used for route calculation is available, and thus can display the high-precision image when the high-precision map is available.

The drawing elements include the traveling direction guide element that guides and displays, with an arrow, the traveling direction including the lane in which the vehicle C travels. Further, the route calculated from the standard-precision map does not include information on the lane, but the high-precision map may include the information on the lane. Then, the information sources include position information indicating the position of the vehicle C, the in-vehicle camera 16 mounted on the vehicle C to capture an image in front of the vehicle C including the lane, and the autonomous driving control device 15 that controls the autonomous driving including a lane change of the vehicle C. The above setting may be set such that the image, in which the arrow indicates the route calculated from the standard-precision map as the traveling direction guide element, is used when the position information, the standard-precision map, and the autonomous driving control device 15 are available and the high-precision map and the in-vehicle camera 16 are unavailable.

As a result, even in a case where the autonomous driving control device 15 can acquire information on the lane in which the vehicle C is traveling, when the in-vehicle camera 16 capable of capturing an image of the lane and the high-precision map for displaying the lane are not available, the route based on the standard-precision map that does not include the information on the lane as the traveling direction guide element is displayed, it is possible to prevent an unnatural display that the lane change is indicated by an arrow even though the lane is not displayed.

The above embodiments are examples for explaining the present invention, and the scope of the present invention is not limited to the embodiments. Those skilled in the art can implement the present invention in various other aspects, without departing from the gist of the present invention.

REFERENCE SIGNS LIST

1 Controller
2 Drawing processor
3 Temporary storage
4 Communication unit
5 Standard-precision map information
30 Navigation system
40 In-vehicle system

The invention claimed is:

1. A navigation system for improving accuracy of an image on a display and presents the image to an occupant of a vehicle, the navigation system comprising:
    a drawing processor configured to draw the image on the display;
    a temporary storage configured to hold data for generating the image; and
    a controller configured to display the image on the display using the drawing processor and the temporary storage, wherein the controller
        acquires data for generating drawing elements from a plurality of information sources and stores the data in the temporary storage, for each of the drawing elements included in the image,
        selects, from among normal available data stored in the temporary storage, data based on the plurality of information sources determined in accordance with a predetermined setting, and
        causes the drawing processor to draw an image combining the drawing elements based on the selected data, and
    wherein the predetermined setting is an information source state management table that indicates each state of the plurality of information sources and a drawing policy of selecting an information source corresponding to a combination of the each state.

2. The navigation system according to claim 1, wherein the predetermined setting is a priority ranking of the plurality of information sources, and
    the controller acquires, from the temporary storage, data based on the plurality of information sources, the data being determined in accordance with the priority.

3. The navigation system according to claim 1, wherein the controller acquires the each state of the plurality of information sources including sensor data, selects the information source corresponding to the combination of the each state in accordance with the predetermined setting, and acquires the data based on the selected information source from the temporary storage.

4. The navigation system according to claim 1, wherein, when normal data is not able to be temporarily acquired from the information source of the data that has been used for generating the drawing elements, the controller uses, until a predetermined time elapses, the normal data already acquired from the information source of data that has been used for generating the drawing elements, and uses, after the predetermined time has elapsed, the data from the information source determined in accordance with the predetermined setting.

5. The navigation system according to claim 1, wherein the plurality of information sources include a standard-precision map that is used for calculating a route to a destination and a high-precision map that includes map information having higher precision than the standard-precision map, and the predetermined setting is performed such that the high-precision map is preferentially selected over the standard-precision map.

6. The navigation system according to claim 5, wherein the drawing elements include a traveling direction guide element that guides and displays, with an arrow, a traveling direction including a lane in which the vehicle travels,
    the route calculated from the standard-precision map does not include information on the lane,
    the high-precision map includes the information on the lane,
    the plurality of information sources include position information indicating a position of the vehicle, an in-vehicle camera mounted on the vehicle and capturing an image in front of the vehicle including the lane, and an autonomous driving control device that controls autonomous driving including a lane change of the vehicle, and
    the predetermined setting is performed such that an image, in which the arrow indicates the route calculated from the standard-precision map as the traveling direction guide element, is used when the position information, the standard-precision map, and the autonomous driving control device are available and the high-precision map and the in-vehicle camera are unavailable.

7. A navigation display method for improving accuracy of an image on a display and presenting the image to an occupant of a vehicle, the navigation display method, by a controller, comprising:
    acquiring data for generating drawing elements from a plurality of information sources for each of the drawing elements included in the image and storing the data in a temporary storage;
    selecting data based on the plurality of information sources determined in accordance with a predetermined setting from among normal available data stored in the temporary storage; and
    drawing an image combining the drawing elements based on the selected data on the display,
    wherein the predetermined setting is an information source state management table that indicates each state of the plurality of information sources and a drawing policy of selecting an information source corresponding to a combination of the each state.

8. The navigation display method according to claim 7, wherein the predetermined setting is a priority ranking of the plurality of information sources, and
    the controller acquires, from the temporary storage, data based on the plurality of information sources, the data being determined in accordance with the priority.

9. The navigation display method according to claim 7, wherein
    the controller acquires the each state of the plurality of information sources including sensor data, selects the information source corresponding to the combination of the each state in accordance with the predetermined setting, and acquires the data based on the selected information source from the temporary storage.

10. A non-transitory computer-readable storage medium configured to store instructions that when executed by a controller, cause the controller to execute:

displaying of an image on a display and presentation of the image to an occupant of a vehicle;

acquiring data for generating drawing elements from a plurality of information sources for each of the drawing elements included in the image and storing the data in a temporary storage;

selecting data based on the plurality of information sources determined in accordance with a predetermined setting from among normal available data stored in the temporary storage; and drawing an image combining the drawing elements based on the selected data on the display, wherein the predetermined setting is an information source state management table that indicates each state of the plurality of information sources and a drawing policy of selecting an information source corresponding to a combination of the each state.

11. The non-transitory computer-readable storage medium according to claim 10, wherein the predetermined setting is a priority ranking of the plurality of information sources, and the controller acquiring, from the temporary storage, data based on the plurality of information sources, the data being determined in accordance with the priority.

12. The non-transitory computer-readable storage medium according to claim 10, wherein the controller acquiring the each state of the plurality of information sources including sensor data, selecting the information source corresponding to the combination of the each state in accordance with the predetermined setting, and acquiring the data based on the selected information source from the temporary storage.

* * * * *